United States Patent
Weber

(10) Patent No.: US 8,261,316 B2
(45) Date of Patent: Sep. 4, 2012

(54) SYSTEM FOR ACCESSING A DATA SET ON THE BASIS OF A-PRIORI KNOWLEDGE OF AN INTERCONNECTION OF A PLURALITY OF CORRESPONDING DATA FILES IN RESPONSE TO AN ACCESS MESSAGE FROM A CLIENT TO A MASTER

(75) Inventor: Michael Weber, Hannover (DE)

(73) Assignee: Thomson Licensing, Issy-les-Moulineaux ( * ) Notice: Subject to any disclaimer, the term of this patent is extended or adjusted under 35 U.S.C. 154(b) by 402 days.

(21) Appl. No.: 12/590,910

(22) Filed: Nov. 16, 2009

(65) Prior Publication Data

US 2010/0146230 A1    Jun. 10, 2010

(30) Foreign Application Priority Data

Dec. 9, 2008   (EP) ..................... 08305905

(51) Int. Cl.
*G06F 12/00* (2006.01)
(52) U.S. Cl. ........... 725/143; 725/76; 711/118; 711/137
(58) Field of Classification Search ............... 725/143, 725/76; 711/118, 137
See application file for complete search history.

(56) References Cited

U.S. PATENT DOCUMENTS

| 6,721,490 | B1 | 4/2004 | Yao |
| 6,954,839 | B2 * | 10/2005 | Idei et al. ................. 711/202 |
| 2005/0125533 | A1 * | 6/2005 | Svanbro et al. ............ 709/225 |
| 2006/0080350 | A1 | 4/2006 | Mark |
| 2008/0120362 | A1 * | 5/2008 | Kapoor et al. ............. 709/203 |

FOREIGN PATENT DOCUMENTS

EP    1345113 A2    9/2003

OTHER PUBLICATIONS

Search Report dated Apr. 6, 2009.

* cited by examiner

*Primary Examiner* — Hong Kim
(74) *Attorney, Agent, or Firm* — Myers, Wolin, LLC

(57) ABSTRACT

A system (1) for storing and/or retrieving a data-set is proposed, wherein the data-set comprises a plurality of data-files, the system comprising: storage(3) for storing the data-set; at least one client(2) being operable to write the data-set to the storage and/or to read the data-set from the storage; to receive an access-request from the client for accessing at least one data-file of the data-set in the storage, wherein the storage master(5) is operable to send an access-message to the storage, wherein the storage is operable to cache further data-files or blocks thereof of the same data-set and/or to allocate storage space for further data-files or blocks thereof of the same data-set as a reaction on the access-message.

16 Claims, 4 Drawing Sheets

SYSTEM FOR ACCESSING A DATA SET ON THE BASIS OF A-PRIORI KNOWLEDGE OF AN INTERCONNECTION OF A PLURALITY OF CORRESPONDING DATA FILES IN RESPONSE TO AN ACCESS MESSAGE FROM A CLIENT TO A MASTER

This application claims the benefit, under 35 U.S.C. §119, of European Patent Application No. 08305905.5 of 9 Dec. 2008.

FIELD OF THE INVENTION

The invention relates to a system for storing and/or retrieving a data-set and relates to a respective method. More specifically, the invention relates to a system for storing and/or retrieving a data-set, wherein the data-set comprises a plurality of data-files, the system comprising: storage means for storing the data-set; at least one client being operable to write the data-set to the storage means and/or to read the data-set from the storage means; and a storage master to receive an access-request from the client for accessing at least one data-file of the data-set in the storage means.

BACKGROUND OF THE INVENTION

The storage of data in networks is often based on distributed storage units. There are some architectures of distributed storage systems known, which allow to store data from a plurality of computers on a plurality of storage units:

For example the network attached storage (NAS) supplies file-based data storage services to other devices of a network, whereby a data storage unit or a data storage array, for example a RAID, is accessed on basis of a TCP/IP-based protocol (network file system (NFS), CIFS) over a network, for example Ethernet.

Another example is a storage area network (SAN), which provides block-based storage and leaves file system concerns on the "client" side. The storage area network allows for connecting hard drive subsystems with storage servers. With the help of a cluster file system it is possible to distribute the access operations of clients on the hard drive subsystems in the storage area network to retrieve the blocks of requested files.

A further alternative is the clustered NAS heads (e.g. pNFS, Lustre), whereby the data access is distributed on a plurality of parallel accesses to hard drive subsystems. The access on the data can be block, object or file based.

All these and further distributed network storage systems are usually adapted for all kinds of application, so that on the one hand side short response times for random access and on the other hand side high bandwidths are provided.

The document U.S. Pat. No. 6,721,490 B1 discloses a hierarchical memory scheme capable of improving a hit rate for the segment containing the random access point rather than improving the overall hit rate of the cache, and a data playback scheme capable of automatically detecting positions that are potentially used as playback start indexes by the user and attaching indexes, are disclosed. The hierarchical storage device stores random access point segment information from which a possibility for each segment to contain a point that can potentially be random accessed in future can be estimated, and controls a selection of the selected segments to be stored in the cache storage device according to the random access point segment information. The document US 2006/0080350 A1, now abandoned, discloses a method and a system for allocating storage space in a storage medium for storing data in a single file from at least one application running in an information system. It is proposed that a least one characteristic of a plurality of a plurality of data storage operations is monitored when data is stored on the storage medium for the file by the at least one application. In a next step a storage pattern is identified from the monitored at least one characteristic of the plurality of data storage operations. On basis of this automatically identified storage pattern an amount of storage space to be used for additional data for the file is determined and allocated.

The document EP 1 345 113 A2 represents the closest prior art and discloses a management server, which manages the physical data areas, which storage devices have, as virtual data areas. In order to improve the efficiency of the management server, a read-ahead procedure is implemented, whereby the server adds new entries to a readahead history information in case data is retrieved from the virtual data areas and uses the readahead history information in case for checking whether or not the data that becomes the read-out target the next time has been already read out onto caches by a previous readahead processing.

SUMMARY OF THE INVENTION

The present invention provides a system and a method for improved data access on network storage systems.

Preferred embodiments of the invention are disclosed in the respective dependent claims, the description and the figures as attached.

The invention relates to a system, which is adapted to and/or operable to store and/or to retrieve a data-set. The data-set comprises a plurality of data-files, whereby each data-file is a separate computer file, comprising a plurality of bytes, a file name and/or file properties. Such computer files are for example known in window systems identified by a file name and an extension. The data-set comprises a plurality of such data-files, for example more than 10 or 50 data-files. In some applications the number of data-files may exceed 500, for example for a 20 s film sequence, or may exceed 100000 for a 70 min film sequence.

The system comprises storage means for storing the data-set. The storage means are preferably implemented as one or more hard drives for non-volatile storage of data. The storage means comprises further one or more caches, which may be implemented as volatile memories and which allow caching of data from the storage means, especially from the hard drives.

The system further comprises and/or is connectable to at least one client, which is operable to write the data-set to the storage means and/or to read the data-set from the storage means. Preferably, a plurality of such clients are provided, which are connected and/or connectable to access the storage means.

For organizing the write and read accesses a storage master is provided, being operable to receive an access-request from the client for accessing a data-file on the storage means, especially for reading and/or writing the data-file from or on the storage means.

According to the invention it is proposed that the storage master is operable to send an access message to the storage means, wherein the storage means is operable to cache further data-files or blocks thereof of the same data-set as a reaction on the access message and/or to allocate storage space for further data-files or blocks thereof of the same data-set as a reaction on the access message.

In one possible embodiment the access-message is realized as a sequence-message, wherein the storage means is informed by the access-message about the identity of the data-set and/or of the data-files or blocks thereof, which will be accessed, but is neutral in view of the access type. In this embodiment, the data means is operable to detect the access type by the communication with the client or clients.

In a further embodiment, the access request is a read request from the client for retrieving at least one data-file of the data-set from the storage means. As a response to the read request, the storage master may provide the client with an answer to the read request, preferably with an address information, for example a physical or logical address, for the data-file or blocks thereof in the storage means.

Alternatively or additionally the access request is a write request from the client for storing at least one data-file of the data-set in the storage means. As a response the storage master may provide the client with an answer to the write request, preferably with an address information, for example a physical or logical address, where the data-file or blocks thereof can be stored.

In the further embodiment it is proposed that the storage master is operable to send a cache message and/or an allocate message as the access message to the storage means, wherein the storage means is operable to cache further data-files or blocks thereof of the same data-set as a reaction on the cache message and/or to allocate storage space for further data-files or blocks thereof of the same data-set as a reaction on the allocate message.

It is one finding of the invention that the known storage systems usually have to provide a tradeoff between short response times for random access and high bandwidths. This tradeoff may lead to performance reduction. Especially in the case of a plurality of parallel access operations, storage systems based on hard drives have to perform a plurality of head moves to minimize the average response time for the parallel/access operations. As a negative effect the bandwidth is decreased due to the time needed for the head moves.

In order to improve the bandwidth as well as the response time it is proposed to use the knowledge that in case one or some data-files of one data-set are stored and/or are retrieved it is quite likely that further data-files of this data-set will be stored and/or retrieved by further requests. On the basis of this a-priori knowledge or statement the access message, especially the cache message and/or the allocate message, is generated and sent to the storage means so that the storage means is able to prepare an improved read or write scheme.

In a possible embodiment of the invention the data-files of the data-set are belonging together and/or are interconnected by their content. The data-files of this type of data-set are not incoherent, but refer to the same information content.

In a further development, the data-set represents an image sequence and/or the data-files represent image files. Especially the data-set allows a frame-based storage of image sequences. Such frame-based storage is for example used in the .dpx format, wherein the single images or frames of the image sequence are saved in one single directory. This directory represents the data-set and the single images or frames represent the data-files. For example, 24 frames and therefore 24 data-files per second of an image sequence are saved to the single directory. In case a client sends a read request or a write request to the storage master concerning one of the frames of the directory, it is quite likely that in the near future or as a next request further frames of the same image sequence and therefore of the same directory shall be stored or retrieved. By sending the access message, especially the cache message or the allocate message, respectively, to the storage means the storage means can transmit further data-files of the same directory to its cache or allocate storage space for further data-files of this directory.

In yet a further possible embodiment of the invention, the image files of one single image sequence are indexed, for example by means of their file name. For example, in the said .dpx format all data-files of one sequence obtain the same file name and are consecutively numbered. With the knowledge of the index of the data-files it is possible to inform the storage means to transmit further data-files to the cache in dependence on the index and/or to allocate memory space also in dependence on the index.

In a further embodiment of the invention the storage master comprises an analyzing module operable to analyze the read request and/or a plurality of such read requests, thereby estimating a need of reading further data-files of the same data-set. However, in another embodiment it is possible that the client sends the information concerning the identity of the present data-set to the storage master. However, it is also possible that the client uses the normal network protocol, so that no adaption of the client for using the system according to the invention is needed. In the further embodiment the analyzing module analyzes the read request and/or the plurality of such read requests and decides whether the read request was only intended for one single frame and therefore a random access or part of a sequence request.

In a development of the invention the analyzing module is operable to estimate the order of the estimated further data-files of the same data-set. In this development the analyzing module is not only capable of identifying the data-set and discriminating between a random access and a sequence request but also to estimate the order of the further data-files needed. The last mentioned estimation is preferably based on the following types of video processing, which are:
  Playback forward: The frames will be requested in an ascending order.
  Playback reverse: The frames will be requested in a descending order.
  Playback fast forward: Each n-th frame will be requested in ascending order.
  Playback fast reverse: Each n-th frame will be requested in descending order.
  Loops: A set of n frames will be requested repeatedly.
  PAN: A set of n frames will be requested forward and reverse.

In order to enable the system to use the estimation of the analyzing module it is preferred that the cache message comprises an instruction and/or data to cache the estimated further data-files or blocks thereof, preferably in the estimated order. After receiving the cache message the storage means will cache the data-files or blocks thereof, which will probably be requested in a next step or further steps from the client.

In a further development of the invention the storage master comprises an analyzing module operable to analyze the write request and/or a plurality of such write requests, thereby estimating a need of writing further data-files of the same data-set. In case the analyzing module recognizes that the client is writing an image sequence with a plurality of image files as the data-set with the data-files to the storage means the storage master can inform the storage means accordingly with the allocate message.

In yet a further embodiment of the invention an analyzing module is operable to analyze the access-request and/or a plurality of such access requests, thereby estimating the need of accessing further data-files of the same data-set. In case the analyzing module recognizes that the client is accessing a sequence the storage master can inform the storage means by accordingly by the access-message, especially by a sequence-message.

In one embodiment the allocate message comprises an instruction to efficiently write the estimated further data-files or blocks thereof in write and/or read areas of the storage means. Preferably, the areas are so arranged, that the number of head moves of a hard drive of the storage means to write and/or retrieve the data-files or blocks thereof is reduced or minimized. Preferably, the areas on one storage medium of the storage means are connected and/or placed adjacently.

In one embodiment of the invention the storage means are implemented as a plurality of storage units, which are connected with the client and/or with the storage master by a network connection. The storage means and/or the storage units are preferably organized block-based, so that the caching—as a preparation of the retrieval of the data-files—is also block-based. According to some embodiments of the inventive system blocks of data are transmitted to the cache, which will probably be requested for during the following requests.

Thus the preferred architecture of the distributed storage network comprises a plurality of storage units as storage means and defines that the storage units store the data files block-wise and that the storage master organizes the file system of the data files. In order to retrieve data files from the distributed storage network it is preferred that the client first retrieves information about the file structure from the storage master as a response to the read request for a single data-file. The information comprises the distribution of the data-file between the plurality of storage units and thus the distribution of the blocks as parts of the distributed data file, so that the client can selectively request the blocks from the plurality of data units.

In a further development, the storage master also controls the temporal distribution during storing and/or retrieving the data-set or the data files of the data set beside the spatial distribution of the data-files. For that purpose, the storage master is adapted to enable a time-management for the storage means, especially for the storage units. In the time-management, time slices are defined for reading or writing a plurality of data-files or blocks thereof of a single data-set to the storage means, especially to a single storage unit during one single time slice. For example, during a single time slice for writing a plurality of write operations are exclusively performed by the storage means, especially by the single storage unit, so that the writing process is not interrupted or disturbed by other read or writing processes. In the same manner reading time slices are defined, during which only reading operations concerning data-files or blocks thereof of a single data-set are performed by the storage means, especially by a single storage unit.

The advantage of the time-management is, that in each single time slice a plurality of read or write operations, respectively, is collected or concentrated, which can be performed in a very effective manner, especially with minimizing the head moves, in case the storage means or storage units are hard drives or disk drives.

It may be advantageous to collect random access operations concerning various data-sets within a further time slice. In this embodiment time slices for (a) reading blocks from one single data-set, (b) for writing blocks from one single data-set and (c) for reading or writing blocks from a plurality of data-sets are defined by the time-management of the storage master.

In a further development of the invention, the time-management may set priorities for distributing the time slices and/or the time slice lengths in dependence on the requesting client. In an embodiment, the time slices for a higher prioritized client may be granted for a longer period and/or may be granted more often than a lower prioritized client. In a further embodiment, a strategy against breakdown of the system may be implemented, whereby in case of an impending breakdown some clients may face restricted data-access or be excluded from the access to the storage means by the time-management or by the storage master, so that some clients, especially higher prioritized clients, are enabled to work and some clients, especially lower prioritized clients, are temporarily slowed down or are disabled.

A further subject-matter of the invention is a method for storing and/or retrieving a data-set, which uses the system according to one of the preceding claims and/or as described before with the features of claim 16.

Further features, advantages and/or effects of the invention are disclosed by the following detailed description of preferred embodiments of the invention.

DETAILED DESCRIPTION

Figure 1:
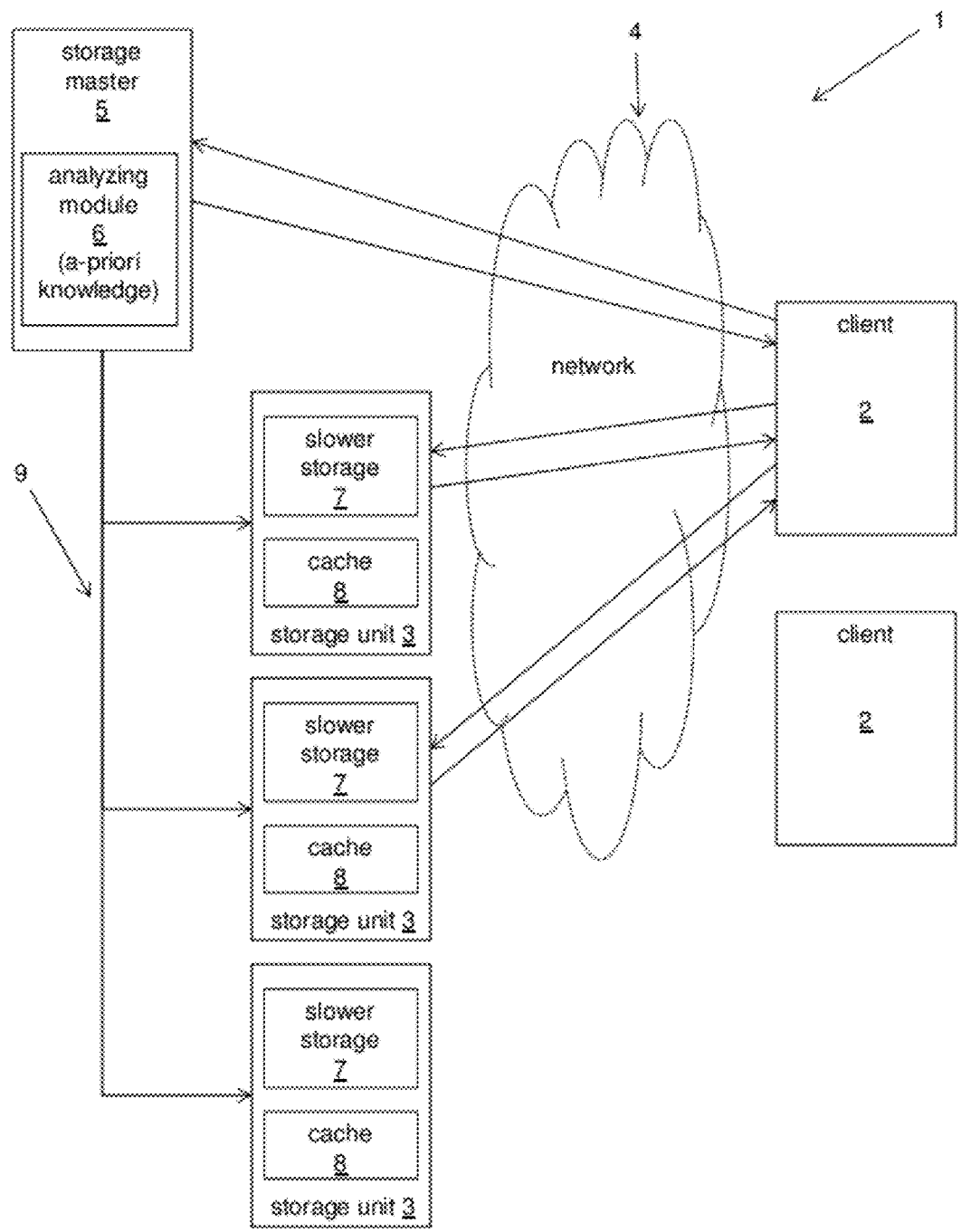
FIG. 1 a schematic diagram of the system according to the invention to illustrate an enhanced read operation.

FIG. 1 shows a schematic block diagram of a storage area network (SAN) 1 or alternatively a clustered NAS heads (e.g. pNFS, Lustre) as possible embodiments of the invention. The SAN 1 comprises one or more clients 2 which are connected to a plurality of storage units 3 by a direct connection 4, for example a network like Ethernet or internet. Furthermore, the clients 2 are connected with a storage master 5 for retrieving location information of data stored in the storage units 3. The storage master 5 is connected with the storage units 3 by a connection 9 for transmitting information concerning optimal read and write tactics.

The exemplary SAN 1 of FIG. 1 is especially adapted to be used in connection with editing of films, for example cinema films. Sequences of the films are stored frame-based, wherein for example in a .dpx format each sequence is stored in a separate file directory and wherein the single frames of the sequence are stored in the file directory all with the same file name and an individual indexing number. This storing architecture allows to determine or to detect which sequence is used, which frames belong to a sequence and which order the frames have on basis of the file system.

Typical types of access on the sequences are random access, meaning that one random frame is requested, playback forward, meaning that the frames are requested in an ascending order, playback reverse, meaning that the frames are requested in a descending order, playback fast forward, meaning that each n-th frame is requested in ascending order, playback fast reverse, meaning that each n-th frame is requested in descending order, loops, meaning that a set of n frames is requested repeatedly and PAN, meaning that a set of n frames is repeatedly requested forward and reverse.

In conventional applications, not belonging to the invention, the clients 2 send a read request to the storage master 5 for a single frame file and receive the location of the blocks of the frame file which are distributed between the storage units 3. In a next step the clients 2 request blocks from the storage units 3 by using the direct connection 4. A disadvantage of the conventional applications is that the storage units 3 have to search for the single blocks in a random access manner, because normally the requests are treated in the order of their arrival.

In the embodiment of the invention according to FIG. 1 the storage master 5 comprises an analyzing module 6, which is operable to analyze a read request or a plurality of read requests from the clients 2. As soon as the analyzing module 6 detects a pattern of the read requests, which indicates that further frame files of the same sequence are required or probably will be requested, it sends a cache message to the storage units 3. After receiving the cache message the storage units 3 transmit blocks of the frame files of the detected sequence from a slower storage section 7 to a fast cache section 8. The slower storage section 7 may comprise a hard drive.

In case the estimation or presumption of the analyzing module 6 was correct the clients 2 are now able to request the blocks which will be delivered from the fast cache sections 8 of the storage units 3, so that the retrieval speed of the data is significantly enhanced. In one possible embodiment of the invention all blocks of the respective requested sequence are transferred to the cache section 8.

In a further embodiment of the invention the analyzing module 6 also estimates the type of the request, which is for example playback forward, playback reverse etc. With the estimated type of the request the storage master 5 and/or the analyzing module 6 are now able to transmit a cache message with an information concerning the identification of the sequence and of the type of the request, so that only the frame files, which will be needed, or blocks thereof are transmitted from the slow section 7 to the cache section 8. For example in case of a playback fast forward only each n-th (second, third, 4th . . . ) frame file or blocks thereof will be transmitted to the cache section 8. It is also possible that the storage master 5 only informs the storage units 3 which blocks and optionally for which host shall be cached. As an option, the storage units 3 report parameters like size of the cache, fill level, idle time, load preferably periodically to the storage master 5 in order to allow an efficient control. Optionally the storage units 3 reports back an detected access type.

Figure 2:
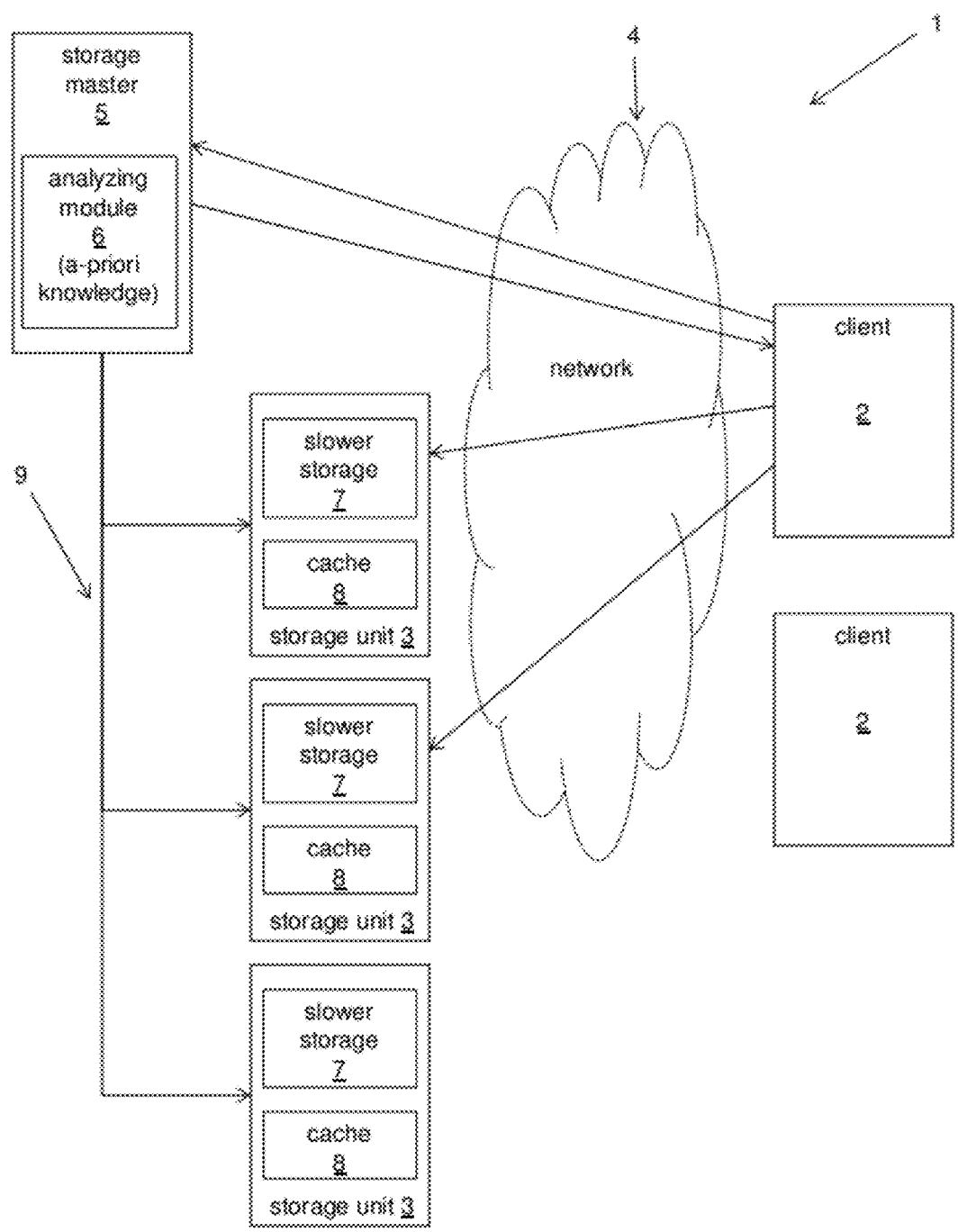
FIG. 2 a schematic block diagram of a system according to the invention for illustrating an enhanced write step.

FIG. 2 shows a further schematic block diagram of the or a SAN 1 as a further development of the first embodiment or as a second embodiment of the invention. FIG. 2 illustrates a write operation on the SAN 1, wherein a write request is sent from the client 2 to the storage master 5. In case a streaming behavior is recognized by the analyzing module 6, that is—for example—the successively request of frame files with an ascending numbering in one single directory, the storage master 5 and/or the analyzing module 6 assigns successive or adjacent blocks in the storage units 3, especially in the slow section 7. Furthermore, the storage master 5 or the analyzing module 6 sends an allocate message to the storage units 3 and orders to allocate the respective blocks, so that on the one hand side the blocks of the frame files of one sequence can be written in an efficient manner and on the other hand side—during a reading process—the frame files of one sequence and/or the blocks thereof can be read also in an efficient manner.

Figure 3:
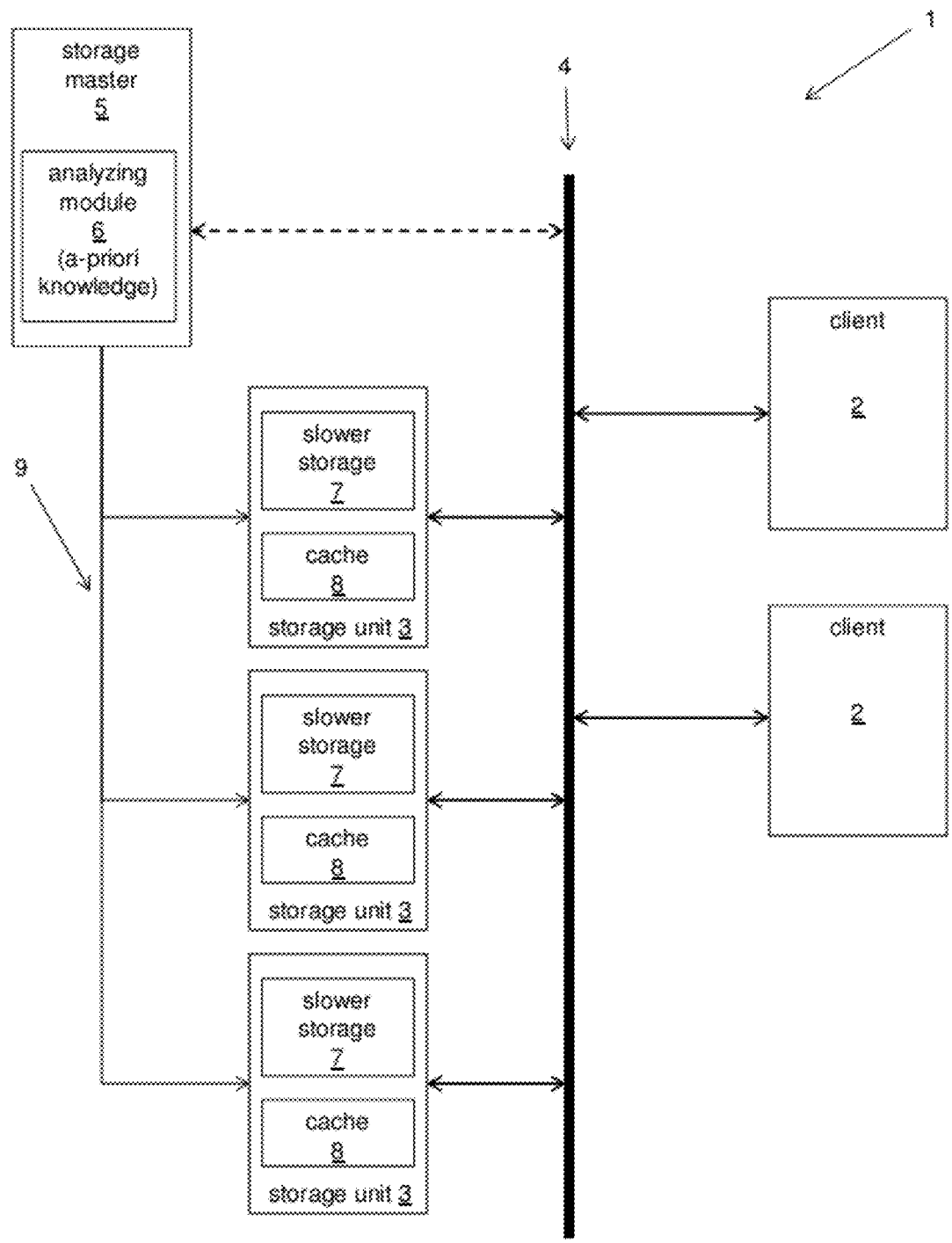
FIG. 3 a block diagram of the overall architecture of the system according to the invention.

FIG. 3 illustrates a possible embodiment of the overall architecture of the SAN 1, wherein on the right hand side a plurality of clients 2 are shown which are connected with storage units 3 and a storage master 5 by means of a network 4. The read requests and write requests from the clients 2 are transferred to the storage master 2 by the network 4. As a response the storage master 5 sends the address information back to the clients 2 also by network 4. The allocate message or cache message is transferred by a separate network connection 9. In other embodiments of the invention, the network connection 9 can also be part of the network 4.

Figure 4:
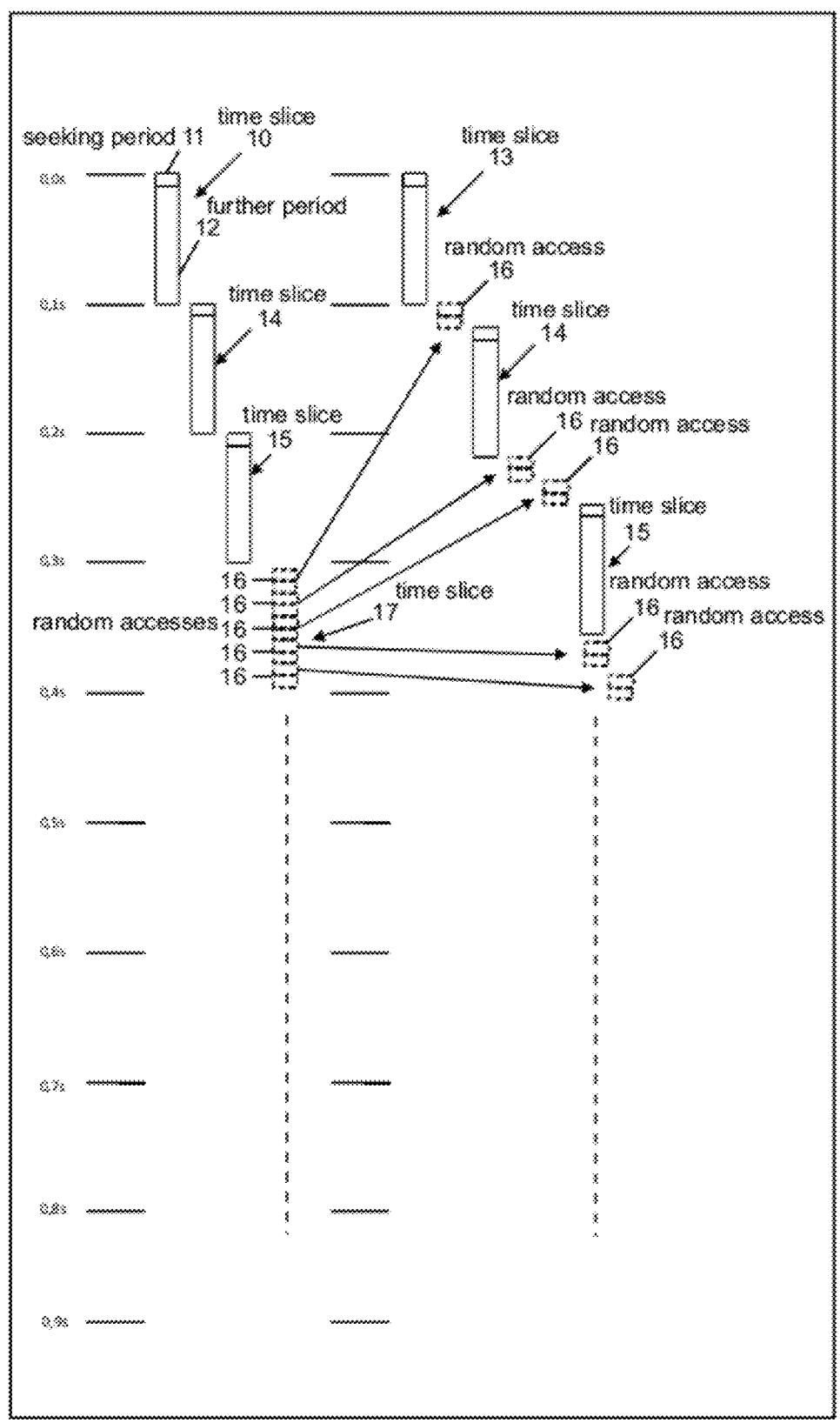
FIG. 4 a diagram for illustrating a time slice method, which can be performed on the system according to the preceding figures.

FIG. 4 visualizes a time slice method, which is controlled by the storage master 5 of the preceding figures. After estimating a need for further data files or blocks thereof of a single data-set, the storage master 5 organizes that the transfer from a plurality of said data files or blocks thereof from the slow section 7 to the cache section 8 of one of the storage units 3 is performed during one time slice 10. The time slice 10 comprises a short period 11 for seeking the requested data-files or blocks thereof and a further period 12 for transferring the plurality of data-files or blocks from the slow section 7 to the fast cache section 8.

In a possible embodiment all data-files or blocks thereof of a data-set, which will probably be needed during a predetermined time period, are transferred during one time slice 10. The predetermined time period may be arbitrary or may be defined by the period between two time slices 10 and 13 regarding the same data-set and/or providing the same client 2. For example during time slice 10 between 0 s and 0.1 s 24 frames or the respective blocks will be transferred, which represents the data for 1 s of a sequence during playback forward. After 1 s a further time slice 13 is started, which transfers the next 24 frames or blocks thereof of the same data-set to the cache section 8. Between time slices 10 and 13 further time slices 14, 15 and 17 are processed, whereby data is transferred, which concerns another data-sets and/or clients 2.

The advantage of the time slice method is that the storage unit 3 collects all data-files or blocks thereof during one duty-cycle without interruption due to random accesses or other requests. As a result the overall performance of the storage unit 3 is increased. Random accesses 16 may be collected and performed during one time slice 17—as it is shown on the left hand side of FIG. 4. As an alternative, the random accesses 16 may be performed between the time slices 13, 14 and 15 as illustrated on the right hand side of FIG. 4 in order to reduce the access time.

What is claimed is:

1. System for retrieving a data-set,
the system comprising:
storage means for storing the data-set;
at least one client being operable to read the data-set from the storage means;
and a storage master being operable
to receive an access-request from the client for accessing at least one data-file of the data-set in the storage means, and
to send an access-message to the storage means, wherein the storage means is operable to cache further data-files or blocks thereof of the same data-set as a reaction to the access-message,
wherein,
the data-set comprises a plurality of data-files, which are interconnected by their content, whereby the access-message is generated on basis of an a-priori knowledge that in case one or some data-files of the data-set are retrieved it is likely that further data-files of the data-set will be retrieved by further requests.

2. System for storing a data-set,
the system comprising:

storage means for storing the data-set;

at least one client being operable to write the data-set to the storage means;

and a storage master being operable to receive an access-request from the client for accessing at least one data-file of the data-set in the storage means, and to send an access-message to the storage means, wherein the storage means is operable to allocate storage space for further data-files or blocks thereof of the same data-set as a reaction to the access-message, wherein the data-set comprises a plurality of data-files, which are interconnected by their content, whereby the access-message is generated on basis of an a-priori knowledge that in case one or some data-files of the data-set are stored it is likely that further data-files of the data-set will be stored by further requests.

3. System according to claim 1, wherein the storage master is operable to receive a read-request as the access-request from the client for retrieving at least one data-file of the data-set from the storage means or to receive a write-request access-request from the client for storing at least one data-file of the data-set in the storage means, wherein the storage master is operable to send a cache-message or an allocate-message, respectively as the access-message to the storage means, wherein the storage means is operable to cache further data-files or blocks thereof of the same data-set in response to the cache-message or to allocate storage space for further data-files or blocks thereof of the same data-set in response to the allocate-message, respectively.

4. System according to claim 1, wherein the data-files of the data-set are belonging together or that the data-set represents an image sequence or that the data-files represent image files.

5. System according to claim 1, wherein the data files are indexed, especially by means of their file name.

6. System according to claim 2, wherein the storage master comprises an analyzing module operable to analyze the read-request and/or a plurality of such read-requests, thereby estimating a need of reading further data-files of the same data-set.

7. System according to claim 6, wherein the analyzing module is operable to estimate the order of the estimated further data-files of the same data-set.

8. System according to claim 7, wherein the order is based on the following types of video-processing:
playback forward
playback reverse
playback fast forward
playback fast reverse.

9. System according to claim 3, wherein the cache-message comprises an instruction to cache the estimated further data-files or blocks thereof, preferably in the estimated order.

10. System according to claim 3, wherein the storage master comprises an analyzing module operable to analyze the write-request and/or a plurality of such write-requests, thereby estimating a need of writing further data-files of the same data-set.

11. System according to claim 1, wherein a write-message comprises an instruction to write the estimated further data-files or blocks thereof to a zone of the storage means in a manner allowing for efficient access depending on the respective storage means.

12. System according to claim 2, wherein the storage means comprise a plurality of storage units, which are connected with the client and/or with the storage master via a network connection.

13. System according to claim 12, wherein the data-files of one data-set are handled file-wise and/or block-wise by the storage units.

14. System according to claim 2, wherein the storage master is operable to define a time management for accessing the storage means.

15. System according to claim 14, wherein the time-management comprises assigning time slices for read and/or write operations of the storage means, wherein a plurality of data-files and/or blocks of a single data-set thereof is handled during one single time slice, or wherein time slices are assigned for handling random access operations.

16. Method for storing and/or retrieving a data-set or blocks thereof, characterized by using the system according to one of the preceding claims, wherein an access-message, especially a cache-message or an allocate-message, is sent to a storage means, wherein the storage means caches further data-files or blocks thereof of the same data-set in response to the access-message, especially the cache-message, and/or allocates storage space for further data-files or blocks thereof of the same data-set in response to the access-message, especially the allocate-message.

* * * * *